United States Patent [19]

Umbert

[11] Patent Number: 4,527,809
[45] Date of Patent: Jul. 9, 1985

[54] QUICK ACTION KEYLESS DRILL CHUCK

[75] Inventor: Juan Umbert, Badalona, Spain

[73] Assignee: Micron S.A.L., Barcelona, Spain

[21] Appl. No.: 466,218

[22] Filed: Feb. 14, 1983

[30] Foreign Application Priority Data

Feb. 22, 1982 [ES] Spain .................................. 509.786

[51] Int. Cl.³ ............................................ B23B 31/10
[52] U.S. Cl. ....................................... 279/64; 279/60; 279/65
[58] Field of Search ...................................... 279/60–65

[56] References Cited

U.S. PATENT DOCUMENTS

| 2,394,555 | 2/1946 | Mann | 279/65 |
| 3,237,955 | 3/1966 | McCarthy et al. | 279/63 |
| 3,599,999 | 8/1971 | Schnizler et al. | 279/60 |
| 3,970,323 | 7/1976 | Schnizler, Jr. | 279/64 |
| 4,230,327 | 10/1980 | Rohm | 279/60 X |
| 4,302,021 | 11/1981 | Rohm | 279/60 |

FOREIGN PATENT DOCUMENTS 520961 8/1955 Italy ..................................... 279/60

Primary Examiner—William R. Briggs
Attorney, Agent, or Firm—Michael J. Striker

[57] ABSTRACT

An improved quick action keyless drill chuck having a single one-piece outer body which encloses all the other components within its interior, a thrust screw in the form of a hollow cylindrical body divided by a division wall into two cavities, a central body with a central longitudinal bore in two sections screwcut such that the rear section accepts the correspondingly threaded spindle of the drilling machine and the front section, of which the diameter is greater than that of the rear section, accepts the screwthread of the thrust screw, this same central body being provided also with two salient cylinder forms on its outer face which fit precisely into the interior of the single outer body; the drill chuck also having the optional complementary device for operation in percussion with a hammer drill consisting of a helicoidal spring which exerts a continuous pressure on the thrust screw, the force being applied against the division wall.

19 Claims, 7 Drawing Figures

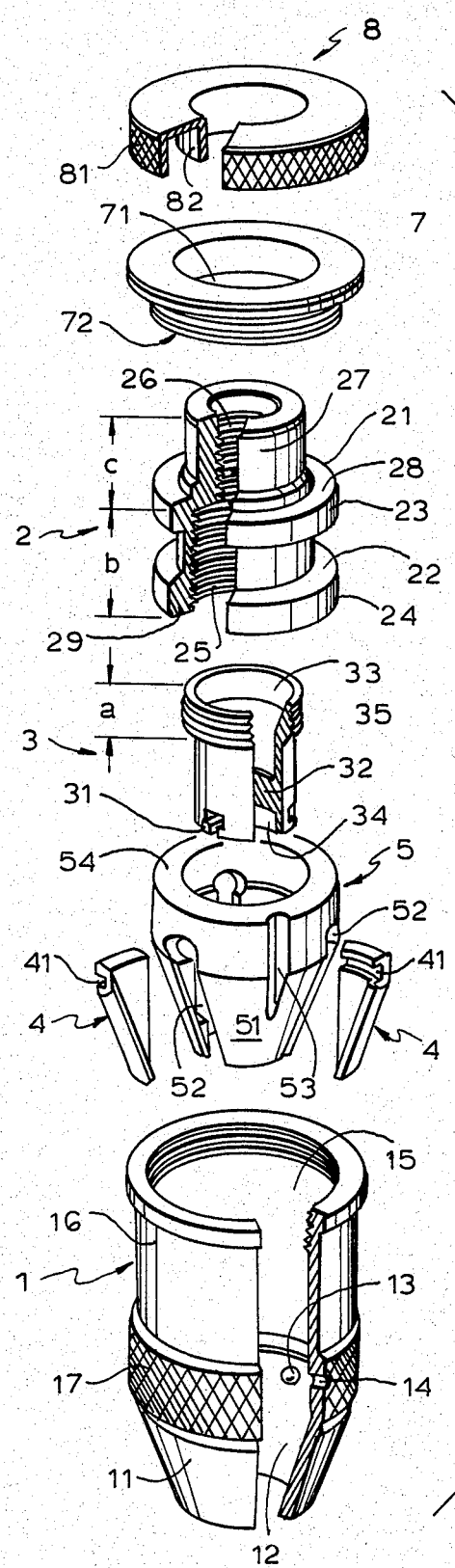
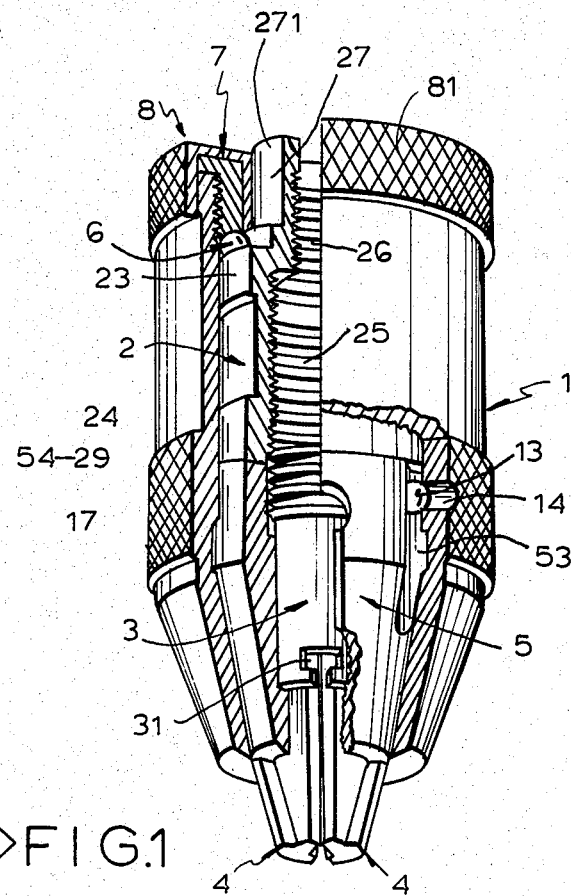
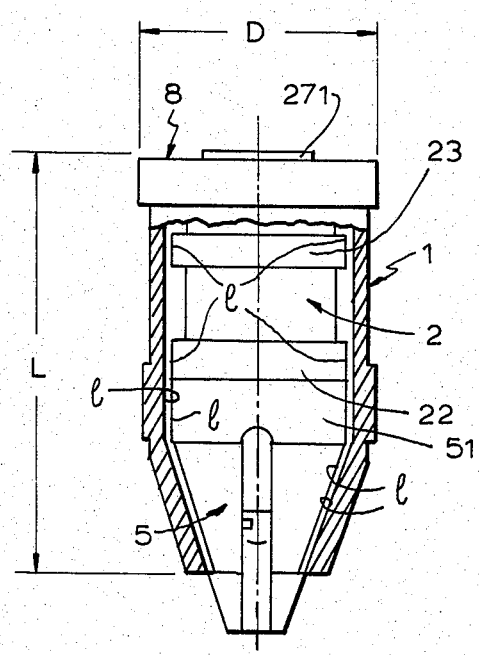
FIG. 1
FIG. 2
FIG. 3

QUICK ACTION KEYLESS DRILL CHUCK

BACKGROUND OF THE INVENTION

The present invention relates to an improved quick action keyless drill chuck.

Drill chucks for fitting to drilling machines and having the characteristics of a rapid hand applied gripping and release action without requiring the use of a chuck key, have been known in the art for many years. (The said key in fact, as currently known is in the form of a handled pinion). We know that keyless chucks call for a high degree of precision so as to provide operating characteristics which would be equivalent to those of chucks requiring a key, within the same catagory. For this reason, on the basis of technical operational equality, such as the capability of performing work of a similar nature, wear resistance, the level of precision in the work operation, mechanical life of the mechanism and other aspects, the cost of quick action keyless chucks has been considerably higher than that of the more traditional drill chucks which are provided with a chuck key. Consequently the user has had to pay a high price for the advantage of the ease of operation offered by a drill chuck not requiring the traditional chuck key. It follows logically that this reason has been a major inhibitor to the potential user who would buy the traditional type of drill chuck solely on account of its lower price.

The drill chuck mechanism which is disclosed in this present invention substantially alters this situation, relating, as it does to a keyless drill chuck, that is to say, self-gripping, which while offering a high quality of operation, has a relatively low cost, enabling it to be competitive with the traditional key operated chucks on the market and hence with the keyless type drill chucks known up to the present.

In addition the invention offers a further advantage in a better load resistance, that is to say it is capable of being subject to at least the same or even greater loads without danger of a breakage in the internal components, particularly of the thrust screw. Furthermore this keyless drill chuck weighs notably less than the keyless drill chucks known at present, a characteristic which is highly advantageous. While recent developments in technology have resulted in new materials in industry, permitting considerable weight reductions in the manufacture of drilling machines, the drill chucks fitted to the front extremity of these same machines have not undergone any significant development in this direction and consequently their disproportionate weight in relation to the machine results in a lack of equilibrium between the machine itself and the drill chuck weight located at its extremity. The drill chuck which is the object of this invention permits considerable progress to be achieved in this respect.

The reduction in the cost of manufacture together with the improved load resistance and the decrease in the weight are the result of the novel elements in the structure of the chuck which, while serving the same ultimate purposes as the currently known keyless chucks, is composed of a number of structural components which are both easy and cheap to manufacture.

The general structure of the currently known keyless drill chucks comprises the following components:

(a) An upper cylindrical outer half-body.
(b) A lower conical outer half-body. This being a conical sleeve fitted by a screw thread to the item (a) above.
(c) A central body.
(d) A thrust screw which is fitted by a screw thread into an axial internal orifice provided in the above mentioned central body (c).
(e) Three chuck jaws which engage, by hooking in mechanically to the leading edge of the above mentioned thrust screw (d).
(f) A guide-cage which provides guidance for the three jaws (e) in the course of their movement for gripping, (forward movement mutually closing in together) and releasing (backward movement mutually separating). This guide-cage (f) is provided with a relatively long skirt at the rear surrounding its rear orifice.
(g) Ball bearings.
(h) Bearing track.
(i) Flange ring, provided with a locking screw for retaining it.
(j) A connecting piece between the guide-cage (f) and the lower conical outer half-body (b).

The technology of the keyless drill chuck of which the more fundamental components have been described above is thoroughly known to the specialists in the art, as is also the mode of operation and therefore the detailed description will not be given in this specification, so as not to make it unnecessarily lengthy. However reference will be made to certain aspects of the mode of operation where it is considered that this would contribute to a better understanding of the invention.

The high cost of manufacture of this keyless drill chuck as currently known, is due in part to the fact that some of its components, particularly the central body (c), have to be relatively long, this affecting as a consequence the length of the components directly connected to the central body, resulting in the high weight of these components and in a large area of the surfaces which require machining. This feature, referred to above is easily appreciated on consideration of the high cost of the materials used in their raw state as well as the high cost of machining. Another factor contributing to the high price of the complete drill chuck is that in the aforementioned known chuck a large number of its components require contact surfaces to be finished to an extremely high standard.

Another object of the invention is to disclose a complementary device especially applicable to the said drill chuck in such cases as it is required to subject the drill, apart from its usual rotary movement, to a reciprocating movement of percussion.

It is common knowledge that the known keyless drill chucks are not capable on their own, (with their simplified basic structure) of maintaining continuously and efficiently a tight grip on the drill when used with a percussion movement. This is because the self gripping tendency on the drill depends in every case on the continuous resistance encountered by the drill in its rotary movement as it penetrates the material being drilled. In the case of a percussion drill there are moments during which the drill is no longer meeting resistance; this occuring during the phase of the hammer operation in which the drill withdraws longitudinally. So as to resolve this problem the fundamental structure of the known keyless drill chucks is extended by means of a complementary device designed so as to ensure that the grip on the drill is maintained during the percussion operation.

These complementary devices, as currently known, possess three basic major disadvantages: they are structurally complex; they are costly to manufacture; and they require the operator to undertake special measures to connect and to disconnect them in fitting them to the drill chuck. Also the structural complexity peculiar to these known devices gives rise to a major increase in the weight of the drill chuck and also to a considerable increase in the length of the said chuck. All the above disadvantages are elliminated by the use of the simple and efficient device, permanently in place, (that is, requiring no action on the part of the operator), to which this present invention patent relates.

DESCRIPTION OF THE INVENTION

The new technique which is the object of the present invention results precisely in the reduction of the cost of the two aspects mentioned above. That is, it results in the keyless drill chucks having a weight which is notably less than that of the known drill chucks. It also results in a reduction in the number of surfaces which require a high grade precision in their finish as compared with the drill chucks as known up to the present.

It is an essential characteristic of the improved quick action keyless drill chuck according to this present invention that it comprises a single one-piece outer body which encloses all the other components within its interior, the rear end of this single said body being closed by means of an annular cover attached thereto by means of a screwthread on the inside rim.

This primary characteristic is itself an important contributor to the desired objectives. In fact, as compared with the known keyless drill chucks, it results in the ellimination of the machining operations corresponding to the attachment means (screwthreading) between the upper cylindrical outer half-body (a) and the lower conical outer half-body (b) described previously. It should be noted also that this attachment means necessitates a high level of quality in fitting, this causing a further enhancement in the cost. This situation no longer obtains with the outer body being made as a single one-piece component, as disclosed in the invention.

Another important characteristic of the drill chuck to which the invention relates is the fact that the thrust screw takes the form of a hollow cylindrical body having within its interior a dividing wall separating two cavities; one rear cavity having a relatively greater length and a front cavity of relatively lesser length; the outer surface of the hollow cylindrical body being provided with a screwthread cut on a relatively small flange immediately adjacent to its rear edge, with the front edge of the said cylindrical body being provided with three sockets, as in the present knowledge of the art, for engaging with the respective jaws.

The new form of this important component, the thrust screw, embodies another novelty that the present invention introduces into the technology of keyless drill chuck mechanisms; this being the fact that the rear cavity of relatively greater length is designed precisely in such a way that the cavity can house the front extremity of the drilling machine spindle thus resulting in a reduction of the length of the central body as compared to known keyless drill chucks. Further on there will be described other characteristics will explain the novel aspects of this invention for their better comprehension as a whole.

Another characteristic of the drill chuck mechanism is that the rear cavity of relatively greater length, according to the invention, as provided in the thrust screw, has an internal diameter dimensioned such that it can accept the front extremity of the spindles of the drilling machines for which the said drill chuck is designed to be used.

It is also characteristic of the drill chuck mechanism that the central body is relatively short and its central internal bore which is screwcut comprises two sections of approximately equal length, the rear section designed to take the spindle of the drilling machine and the front section having an internal diameter specifically greater than that of the rear section designed to accept the screwthread which has been cut on the flange provided on the thrust screw on the outside of the rear edge thereof. This central body has furthermore, on its outer surface, two salient cylinders, separated from each other and of which the respective external surfaces are machined to a high degree of accuracy so as to correspond to the internal surface of the single one-piece outer body which has also been machined to a high degree of accuracy with the objective of ensuring a high level of precision mutually between the two surfaces and thus an accurate centering of the central body within its housing.

The new structure of the thrust screw together with the new structure of the central body of the keyless drill chuck as disclosed in the invention offers another important advantage over the currently known keyless chucks, this advantage being the very considerable increase in resistance to the forces applied to the said thrust screw which is the component subject to the greatest unit force of the entire assembly. For this reason it frequently occurs that in the known drill chucks, referred to above, there is a failure due to the breakage at the head of the thrust screw precisely at the junction position between the relatively small diameter screwcut section and the head which in order to accept the engagement of the jaws, has a greater diameter. The thrust screw as disclosed in the invention is dimensioned such that the diameter of the whole component is more than adequate to withstand all the forces which the machine could exert without danger of a breakage of the component, including those which may arise due to overloading beyond the limits of the specified duty in normal use. Experiments carried out with drill chucks in accordance with the invention, on this particular aspect, have shown that in instances of overloading, (as for example by using the drill chuck for operations carried out with a drill having a diameter some 50% greater than the permitted size, on high resistance material) the thrust screw has remained undamaged, any failure being limited to the gripping action of the jaws which have tended to slip on the drill shank, even to the point of the drill breaking. These experiments were carried out, naturally, using a drilling machine far more powerful than that for which the drill chuck was designed.

Another feature of the drill chuck mechanism lies in the fact that the screwcut external flange at the rear of the thrust screw has a length which is notably shorter than length of the internal front section of the central body, which same section is provided with a screw thread to engage with the above flange.

This feature represents another novel characteristic which is advantageous, in this invention, insofar as the known keyless drill chucks have a thrust screw with a considerable length of screwthread which necessitates an increase in the total length of the drill chuck itself so as to prevent the said thrust screw colliding with the front extremity of the drilling machine spindle. In the new drill chuck, due to the increased diameter of the hollow body represented by the thrust screw the screw-cut length can be considerably reduced while still retaining the same mechanical effect, nevertheless. At the same time the length of travel of the thrust screw remains the same as in the known drill chucks due to the increased length of the screwthread section of the central body which accepts the said thrust screw.

The above characteristic is very important from the point of view of cost in that the cost of manufacture of this item, as depicted above, is low. The use of a light material is permissible because in accordance with this novel technique the only requirement for a high level of accuracy is in the external conical area which is in contact with the corresponding internal conical area of the one-piece outer body of the drill chuck. The other contact areas are not critical due precisely to the one-piece design of the said outer body.

Another characteristic feature of the drill chuck mechanism lies in the fact that the rear face of the guide cage is a flat surface.

This flat surface is in contrast to the elongated cylindrical skirt which features in the known keyless chucks. In these known drill chucks the long length of skirt has a specific and necessary object which is to ensure the correct alignment of the various components making up the drill chuck and to ensure their coaxial position and to achieve this it is important that the skirt should match itself to its immediately contiguous components with a high degree of precision. In the drill chuck as disclosed in the invention such a degree of matching is not necessary due to the characteristic constructional design of the chuck.

Another characteristic of the new drill chuck mechanism is that the inner face of its annular cover is in direct contact with the balls of the internal bearing assembly.

This latter feature also contributes to the reduction in the size and to a lesser weight as well as reducing the manufacturing cost by elliminating the need for the normal ball race as fitted in the known keyless chucks. This advantage arises from giving the annular cover two functions; the prime function being to act as a closure to the upper extremity of the one-piece outer body and the secondary function being to serve as ball race.

A particular novel and characteristic feature, as well, is the use, as a connecting means between the guide cage and the single outer body, of a small sphere which is housed partially in an elongated recess in the above mentioned guide cage and partially in another recess, which is smaller and into which the sphere fits, provided in the inside face of the single outer body.

The mutual matching of the elongated recess with the smaller recess, using a sphere between the two recesses is a novel and efficient means of fixing these components, rendering the carrying out of their assembly, simple, quick and precise.

It should be noted that the complementary device for working in percussion described further on, as a hammer drill, is strictly optional with respect to the basic structure described above.

A characteristic of the new drill chuck mechanism according to the invention is that it can include a complementary device for working as a hammer drill comprising a helicoidal spring resting against an internal step specifically provided in the central body in the transition zone between the rear and the front section of the body and extending through the length of this body and applying a permanent compression force against the thrust screw, on the division wall thereof, through the intermediary of a means for distributing the force exerted by the said spring, the internal diameter of this said spring exceeding the diameter of the drilling machine spindle.

The operation resulting from the function of this spring in conjunction with the characteristic structure of the thrust screw which has the form of a hollow cylindrical body achieves the desired effect with extraordinary efficiency. The spring exerts a continuous force against the said thrust screw ensuring that the jaws remain continuously thrust into their forward position. In this manner the permanent gripping action of the jaws on the drill is maintained. It follows that the force exerted by the spring must be adequate to provide the minimum jaw grip pressure required. It may be seen that in this manner there is no tendency to loosen the jaw gripping force during the withdrawal phase of percussion during use as a hammer drill.

Equally, it can be seen that this complementary grip does not prove detrimental in any way to the functioning of the drill chuck when it is not being used as a hammer drill. Hence there is no necessity to provide a device for connecting up or releasing the spring action, making it highly advantageous to use this drill chuck which does not call for the above mentioned inconvenience which arises with known mechanisms.

As an intermediary component capable of distributing the force of the spring over the area of the division wall of the thrust screw for preference an adequately dimensioned sphere is used.

This invention patent also discloses a very simple and extremely efficient dust protection device characterized by comprising a flexible sealing ring which is placed and held between the rear flat face of the guide cage and the front face, correspondingly flat, of the central body.

This arrangement prevents the passage of dust towards the more delicate zones in the interior of the central body, the mating surfaces of the external face of the said central body and the inside face of the one-piece outer body. Furthermore the said sealing ring can take up the dimensional tolerance on fitting the guide cage to the central body.

The said sealing ring may be used in conjunction with an outlet for the dust in the form of an orifice provided in the front conical zone of the one-piece outer body. Such orifices are already known in the technique of drill chuck mechanisms having provision for dust protection devices and their role is to provide a ready path for the outward flow of dust which has accumulated between the jaws, and which is then expelled under the influence of centrifugal force.

While the above described sealing system may be incorporated at the option of the manufacturer in the case of drill chucks not destined for use with a hammer drill, where the drill chuck mechanism does in fact include this use it is absolutely essential to provide the dust protection device as described above as in such a case the effect of dust is much more prejudicial when the chuck is used for this purpose.

BRIEF DESCRIPTION OF THE DRAWINGS

The drawings accompanying this specification illustrate an example of an embodiment, which is not limitive, of an improved quick action keyless drill chuck, in accordance with this present invention.

FIG. 1, is an exploded perspective view in which appear the component parts of the drill chuck displayed longitudinally.

FIG. 2, is an overall perspective view of the assembled drill chuck. This view shows partial cross sections in the conventional form on the longitudinal axis so as to show the relative positions of the various components of the drill chuck.

FIG. 3, is a schematic view of the drill chuck to a smaller scale on a longitudinal cross section. The principal dimensions of the drill chuck are shown in FIG. 3, corresponding to the Table I, shown later in this description.

DETAILED DESCRIPTION OF A PREFERRED EMBODIMENT

Figure 4:
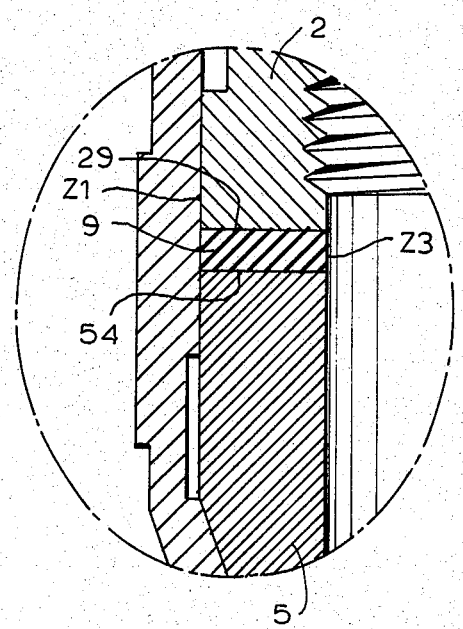
FIG. 4, shows a detail in section which illustrates the dust protection device which is disclosed in the invention.

The drill chuck mechanism as shown in the drawings comprises the following basic components:
- the single outer body 1, this being in one piece and housing within its interior most of the other components that the mechanism comprises.
- the central body 2;
- the thrust screw 3;
- the three gripping jaws 4;
- the guide cage 5;
- the ball bearing balls 6 (shown only in the FIG. 2);
- the annular cover 7;
- the hand grip ring 8.

The structure of the one-piece body 1 is very important in this mechanism. The guide cage 5, is housed within the front conical section 11 of this said body 1, with a high precision fit between the outer conical surface 51 of the said guide cage and the corresponding internal face 12 of the previously mentioned front conical section 11.

The gripping jaws 4 are slotted into the corresponding elongated guide slots 52 of the guide cage 5 with the hooked sections 41 which are provided at the top extremity of the jaws engaging with the cavities 31 provided for this purpose at the lower edge of the thrust screw 3, which latter is partially entrant into the guide cage 5.

The small ball 13 is a novel and important feature which provides the assembly means of the drill chuck. It is housed between the outer face 51 of the guide cage 5 and the internal face of the body 1, being partially and precisely fitted into a characteristic lengthened recess 53 of the said guide cage 5 and partially into the other characteristic recess 14 in the body 1. It thus ensures the relative immobility between the two said components, that is; the body 1, and the guide cage 5, once the mechanism has been assembled.

The rear face 54 of the guide cage 5 is flat and faces the equally flat front face 29 of the central body 2.

The movements of the various mobile elements of the mechanism occur in a manner essentially similar to those comprising the techniques already known in the art and of public knowledge. The forward movement of the thrust screw 3 produces the forward movement of the gripping jaws 4 until arrested on reaching the end of their travel or on meeting an obstacle such as the cylindrical shank of a drill, which they then firmly grip. It is also known that the manual operation of tightening and loosening is carried out by rotating the hand grip ring relative to the body 1 or vice versa in the direction appropriate to each case. Finally it is also known that the self-gripping of the drill shank (not shown in the drawings) during the drilling process arises due to the forward thrust exerted on the thrust screw 3 produced by the force of resistance of the jaws in a giratory direction opposed to the giratory direction of the drill during the cutting operation, all this clearly taking place because the screw 3 and the central body 2 are mutually connected by a screwthread of which the direction for the forward movement of the screw 3 is opposed to the giratory direction of the drill.

As has been previously stated an important characteristic of the drill chuck mechanism consists in the outer body 1 being of one single piece. Another important characteristic is the structure of the thrust screw 3 as referred to previously. This thrust screw 3 has the form of a hollow cylindrical body, there being in its interior a dividing wall 32 which defines two cavities: one rear cavity 33 and a front cavity 34. At its rear extremity, on its outer face it has a screwthread cut on a relatively short flange of length "a". The cavity 33 possesses outstanding advantages. It provides a housing for the lower extremity of the drilling machine spindle, for which purpose it obviously has a sufficiently dimensioned diameter. As a result of this large diameter of the cavity 33, it follows necessarily that the diameter of the thrust screw 3 is also large, giving it a very high resistance to fracture in compression however great the work load on the thrust screw may be. In addition to this the characteristic of being able to house the drilling machine spindle lower extremity within the cavity 33 results in a major saving in the length of the overall structure of the drill chuck mechanism.

The central body 2 is also a novel feature and has a characteristic structure. In order to ensure that it fits correctly and accurately to the inner surface of the outer body 1, the structure of this said central body includes two cylindrical flanges 21 and 22 of which the respective outer surfaces 23 and 24 are machined to a high surface finish so that said central body 2 can be fitted to a high degree of precision within the outer body 1, while being absolutely concentric therewith. Equally the inner surface 15 of the cylindrical section of the outer body 1 is machined to a high degree of precision and surface finish.

FIG. 3 is a sketch showing the level of precision in the surface areas of this mechanism. The thick lines marked "1" indicate the surfaces requiring a high precision finish and it may be seen that there are very few, a feature contributing favourably to the low cost of manufacture.

Refering again to the central body 2, the characteristic of its relatively short length due to the cavity 33 in the thrust screw, 3 is very important and also of importance is the feature of its central bore having two sections, 25 and 26, quite distinct one from another and of which the lengths "b" and "c" are approximately equal or similar. The forward section 25, of length "b" has a diameter notably greater than the diameter of the rear section 26, of length "c" to which the drilling machine screwcut spindle is screw fitted and the threaded thrust-screw 3 is similarly screwed in to the front section 25, by means of its external thread 35 which corresponds to the thread in that section. It is of importance to observe that the length "a" of the thread 35 is notably shorter than the length "b" of the threaded section 25 into which it screws. This means that the maximum length of travel of the thrust screw is governed by the length of the said section 25.

The annular cover 7 provides the closure for the outer body 1, screwing into its upper end. The diameter of its central bore 71 is greater than the diameter of the rear cylindrical section 27 of the central body 2, such that the said section 27 protrudes slightly, 271, and leaves an intermediate space which is free to accept the inner wall 82 of the hand grip ring 8.

Ball bearings 6 are located between the front face 72 of the cover 7 and the rear face 28 of the upper cylindrical flange 21 of the central body, these for the purpose of providing a smooth relative rotation of the central body 2 in relation to the outer body 1, during the tightening and releasing operation.

The operation of tightening and releasing, as mentioned above, is carried out by means of the hand grip ring 8 which is attached, preferably by means of a press fit to the rear cylindrical section 27 of the central body 2. This ring for preference has a knurled outer rim 81 to facilitate the hand grip. Similarly the outer body 1 has a raised section of its cylindrical outer surface knurled for ease of gripping. It is clear that this hand grip ring 8, being attached only to the aforementioned section 27 can rotate relatively to the outer body 1 and in relation to the annular cover 7 which is firmly attached by screwing, to the said outer body 1. For preference the hand grip ring 8 should be a stamping, giving it a low manufacturing cost and also, as mentioned previously allowing it to be fitted solidly by a press fit to the rear cylindrical section 27; this again being a cost reduction feature.

The TABLE 1, shown below gives a comparison of the dimensions and weights of various keyless drill chuck mechanisms currently in the market with the dimensions and weights of the drill chuck in accordance with this invention. The dimensions L and D are referenced to in FIG. 3.

TABLE I

| | L = Total Length | D = diam. of outer body | Weight | Max. drill diam. to be used |
|---|---|---|---|---|
| A | 68 mm. | 35 mm. | 326 gr. | 10 mm. |
| B | 70 mm. | 35 mm. | 350 gr. | 10 mm. |
| C | 72 mm. | 35 mm | 360 gr. | 10 mm. |
| D | 79 mm. | 37,5 mm. | 350 gr. | 10 mm. |

TABLE I-continued

| | L = Total Length | D = diam. of outer body | Weight | Max. drill diam. to be used |
|---|---|---|---|---|
| X | 60 mm. | 32 mm. | 200 gr. | 10 mm. |

Symbols used below:
A = Drill chuck manufactured by MICRON, S.A. (Spain) Model: 800-1-10
B = Drill chuck manufactured by ROHM (West Germany) Model: 139-10S
C = Drill chuck manufactured by PORTA (Italy) Model: Validus 35
D = Drill chuck manufactured by METABO-WERKE GMBH (West Germany) Model: 801-1/10
X = Drill chuck as disclosed in the invention.

It may be seen from the above table that for a given common diameter of maximum admissible drill, in the case in point 10 mm. the dimensions and the weight of the drill chuck as disclosed in the invention is notably less than those of the others listed.

It should also be pointed out that the length of the gripping jaws in the drill chuck disclosed in the invention is equal to or virtually equal to those of other drill chucks in the same category, thus indicating that there is no diminution in the gripping effort although the other dimensions have been decreased.

FIG. 4 is a longitudinal cross section in which can be seen the exact position in which may be housed, should it be so desired, a characteristic and novel flexible ring 9 with the object of preventing dust penetration during the drilling process. In particular the entry of dust into the interior of the central body 2 is avoided, thus preventing that the precision fitting of the outer surface of the said central body (sections 23 and 24), 2, with the internal surface of body 1, becomes disturbed, in the areas Z1 and Z2. See also FIG. 5. In particular, the flexible ring 9 prevents the passage of dust through any interstices in the region Z3, to the interior of the body 2.

The flexible ring 9 has another important function which consists in taking up any dimensional tolerance in the fitting or in the spacing provided between the surfaces of the rear face 54 of the guide cage 5 and the front face 29 of the central body 2. The ring 9 is preferably made in a synthetic rubber.

Protection against dust is finally provided by means of an aperture 18 in the wall of the body 1, provided for this purpose. The operation and technology of this aperture being already known in the art. The above mentioned dust protection means, that is to say, the flexible sealing ring 9 and the aperture 18, must necessarily be used in the construction of the drill chucks when these are to be utilized in conjunction with a hammer drill, with the combination of the drill's rotary motion and the percussion effect on the drill in the longitudinal direction from the surface being drilled.

The complementary device ensuring a firm grip on the drill during percussion is also a novel feature and a characteristic of the mechanism of the drill chuck as disclosed in the invention. In fact, the novel basic construction as disclosed in the invention, allows for fitting within the drill chuck interior, should it be so required, the fundamental components of which the said device in composed.

Figure 5:
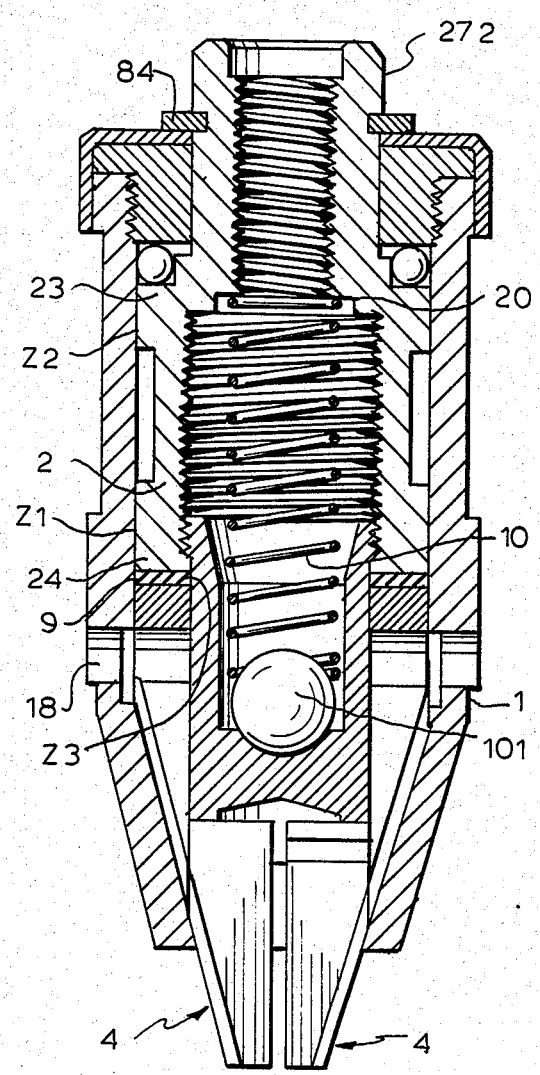
FIG. 5, is a longitudinal cross section on the central axis of the drill chuck mechanism according to the invention, fitted with a a new characteristic device for use of the chuck with a hammer drill, complementary to the said drill chuck.

The above mentioned device consists of a helicoidal spring 10 and an intermediary conponent 101. FIG. 5 shows these components clearly. The helicoidal spring 10 rests at its rear extremity against an internal step 20 provided for this purpose in the central body 2 and exerts a strong force on the thrust screw 3. The pressure of the spring 10 is uniformly spread by means of the intermediary component 101, which in this case is a sphere, and thus prevents the occurence of surface damage which could be caused by the said spring 10 on the thrust screw 3. In this manner the thrust screw 3 is under a continuous pressure forward, thus ensuring continuity of the gripping action of the jaws even during the withdrawal phase of the drill in the course of the percussion cycle.

Figure 7:
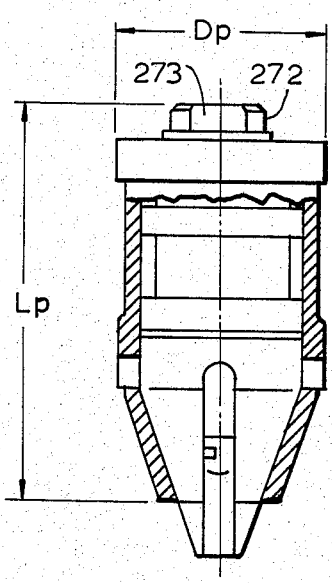
FIG. 7, is a schematic drawing of the drill chuck mechanism fitted with the aforementioned complementary device and in which are given the principal dimensions corresponding to the Table II which is shown later in this description.
Figure 6:
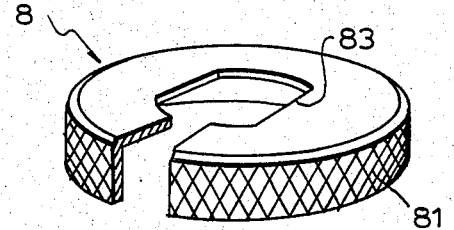
FIG. 6, shows a component detail.

Due to the strong locking action that occurs between the drill chuck and the drilling machine spindle which screws into the section 26 of the central body 2, it is necessary to arrange that the rear cylindrical section 27 of the said central body 2, protrudes to some extent beyond the top surface of the ring 8, such that two (or more) flats 273 can be provided on the protruding length 272 (see FIGS. 5 and 7) and to which can be applied a suitable tool for the purpose of separating the said drill chuck from the drilling machine spindle. This procedure is common to the majority of the drill chucks fitted with hammer drill devices as this strong locking effect occurs in all of them. It is evident that in this case the tight press fitting to the wholly cylindrical section 27 will not be required for retaining the hand grip ring 8 as advantage can be taken of the flats 273, fitting into a corresponding shape in the orifice 83, providing thus a perfect geometric locking arrangement, all of which can be seen from FIG. 6. A locking washer 84 holds the ring 8 in its place. This is also a technique already known in the art, common to and employed in many other models of drill chuck. The above results in an increase in length as compared to the drill chucks not having the hammer drill device incorporated.

In the table II shown below can be seen a comparison of weights and dimensions of the various keyless drill chucks in the market currently and fitted with percussion devices. Also shown is the weight and the dimensions of drill chuck mechanism as disclosed in the invention, equally fitted with its novel and characteristic percussion device. In each case account has been taken of the increase in length caused by the rear protruding section having flats for gripping with a spanner. References to the dimensions Lp and Dp are shown in the FIG. 7.

TABLE II

|   | Lp = total length | Dp = diam. of outer body | weight | max. diam. of drill to to be used. |
|---|---|---|---|---|
| E | 87.5 mm. | 42,5 mm. | 610 gr. | 13 mm. |
| F | 90 mm. | 42,8 mm. | 550 gr. | 13 mm. |
| G | 87 mm. | 45 mm. | 695 gr. | 13 mm. |
| Xp | 77 mm. | 38 mm. | 370 gr. | 13 mm. |

Symbols used below:
E = Drill chuck manufactured by ROHM (West Germany) Model: 141-13SK
F = Drill chuck manufactured by METABO Metabowerke GmbH & Co. Nurtingen (West Germany) Model: 805/2-13
G = Drill Chuck manufactured by ING. LUCIANO PORTA & C.s. a,s. BIRGARETTO- Torino- Italy. Model: PORTA-Validus 37 PK.
Xp = Drill chuck in accordance with the invention.

The technological improvement in the mechanism disclosed in the invention is applicable in all types of drill chucks currently on the market, that is to say; (a) light duty drilling machines of the type referred to in the DIY category, including those used by enthusiasts or for small scale industrial purposes; (b) those used in medium duty applications in industry; (c) high precision industrial drilling machines. In fact the quality versus cost relationship may hold good in all the above three cases on a competitive basis even in some instances showing a better economic factor than any of the keyless drill chucks at present known in the art.

It will be understood that each of the elements described above, or two or more together, may also find a useful application in other constructions differing from the types described above.

While the invention has been illustrated and described as embodied in a quick action keyless drill chuck, it is not intended to be limited to the details shown, since various modifications and structural changes may be made without departing in any way from the spirit of the present invention.

without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A quick-action keyless drill chuck of a drilling machine having a spindle and a drill bit comprising:
an outer body of one piece, having a rear end;
means for connecting the spindle and the drill bit to the outer body, the connecting means being completely enclosed within the outer body and including a thrust screw movable axially in a threaded bore within said connecting means and having a hollow cylindrical shape for housing a portion of the spindle, the thrust screw having an interior divided by a separating wall so as to provide a rear cavity of a certain length dimensioned to receive with clearance the end of said spindle and a front cavity of a length smaller than the length of the rear cavity;
means for covering the rear end of the outer body.

2. A keyless drill chuck according to claim 1, wherein the outer body has a cylindrical section the inner surface of which is finished to a high degree of precision.

3. A keyless drill chuck as defined in claim 1, and further comprising a plurality of gripping jaws, and wherein the thrust screw includes a rear end provided with a flange portion which has an external thread and an outer diameter, and a front end provided with a plurality of spaced sockets along its periphery for engaging the plurality of gripping jaws, and also having an outer diameter equal to the outer diameter of the flange portion.

4. A keyless drill chuck as defined in claim 1, wherein the rear cavity has a a smooth inner diameter sufficiently dimensioned to receive the spindle.

5. A keyless drill chuck as defined in claim 3, wherein the connecting means further include a central body of cylindrical shape which has a front section provided with an upper and a lower flange portion spaced from each other, and a rear section, the front section having a predetermined internal diameter larger than the internal diameter of the rear section so as to form an inwardly projecting shoulder.

6. A keyless drill chuck as defined in claim 5, wherein the rear section is provided with an internal thread for receiving the spindle, and the front section is provided with an internal thread for cooperating with the external thread of the flange portion of the thrust screw, and further including a transition area between the front section and the rear section in which area is formed the inwardly projecting shoulder.

7. A keyless drill chuck as defined in claim 5, wherein the upper and lower flange portion of the central body have each an outer surface which is finished to a high degree of accuracy so as to match to the inner surface of the cylindrical section of the outer body for accurately centering the central body within the outer body.

8. A keyless drill chuck as defined in claim 7, wherein the flange portion of the thrust screw has a length shorter than the length of the front section of the central body.

9. A keyless drill chuck as defined in claim 5, wherein the covering means includes a cover of T-shaped cross section, and also having a central bore extending therethrough, a portion of the cover having a smaller diameter being provided with an external thread, and further includes a hand grip having an inverted U-shape.

10. A keyless drill chuck as defined in claim 9, wherein the rear end of the outer body is provided with an internal thread screwable with the external thread of the cover.

11. A keyless drill chuck as defined in claim 9, wherein the rear section of the central body has an outer diameter, and the central bore of the cover has an inner diameter which is greater than the outer diameter of the rear section so that an intermediate space is provided between the cover and the rear section of the central body.

12. A keyless drill chuck as defined in claim 11, wherein the hand grip partly surrounds the cover and has one wall which is located within the intermediate space for providing a press fit with the rear section of the central body, the hand grip being rotatable relative to the outer body and relative to the cover.

13. A keyless drill chuck as defined in claim 12, wherein the hand grip has a knurled outer rim.

14. A keyless drill chuck as defined in claim 9, wherein a ball bearing is provided between the portion of smaller diameter of the cover and the upper flange of the central body for providing a relative rotation of the central body and the outer body.

15. A keyless drill chuck as defined in claim 5, wherein a flexible sealing is provided between the guide cage and the central body for preventing dust penetration into the central body during drilling and for compensating any dimensional tolerances between the guide cage and the central body.

16. A keyless drill chuck as defined in claim 15, wherein the flexible sealing is of rubber.

17. A keyless drill chuck as defined in claim 5, wherein an intermediary member is located at the separating wall of the thrust screw, the central body partly encompassing a helicoidal spring, the one end of which resting against the shoulder of the central body and the other end of which rests against the intermediary member so as to exert a uniform force on the thrust screw.

18. A keyless drill chuck as defined in claim 17, wherein the intermediary member is a sphere.

19. A keyless drill chuck as defined in claim 17, wherein the spring has an intermediate diameter which exceeds the diameter of the spindle.

* * * * *